2 Sheets—Sheet 1.
C. H. SIKES.
Plant and Vine Culture.
No. 221,620.      Patented Nov. 11, 1879.
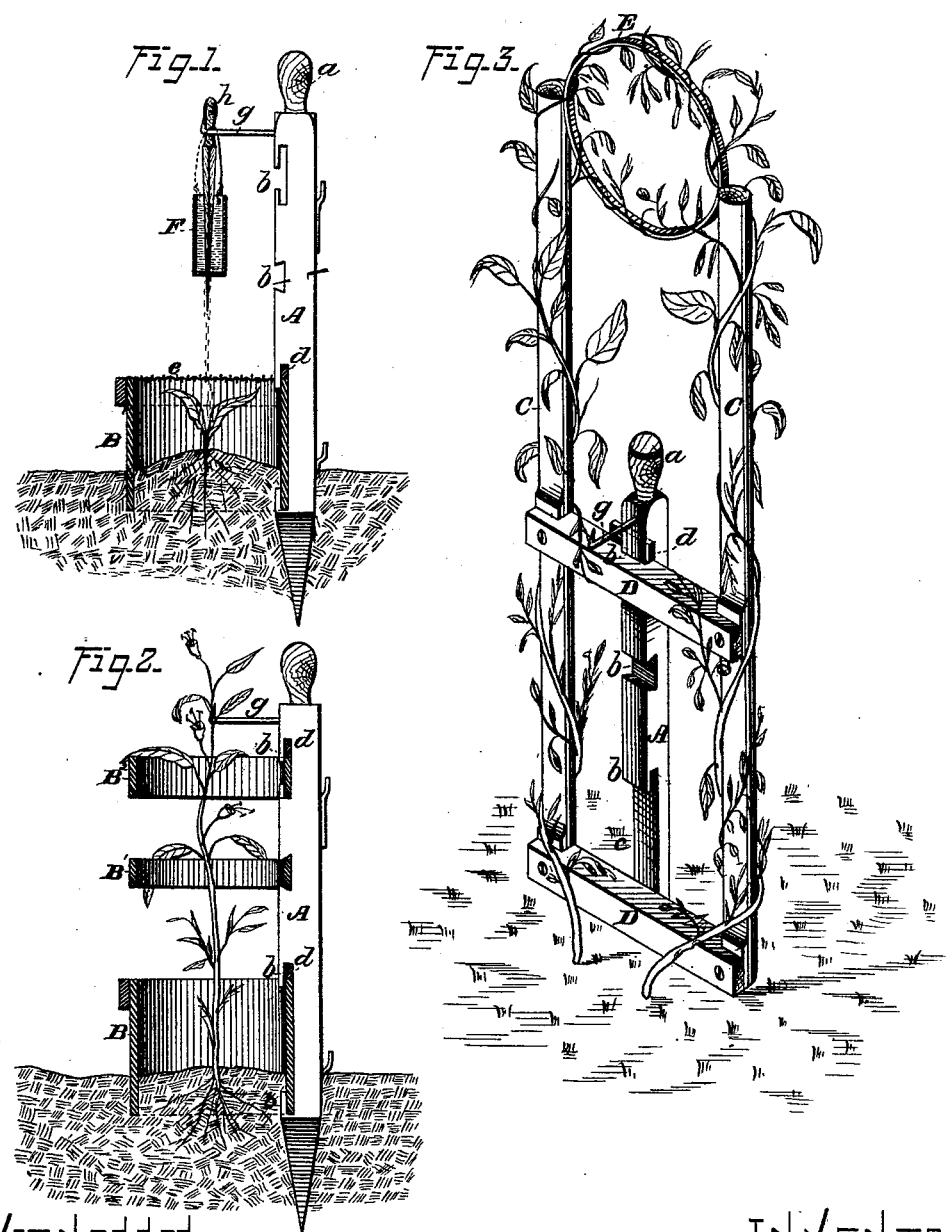
WITNESSES:
Jas. E. Hutchinson.
Floyd Norris.
INVENTOR:
Charles H. Sikes
by Johnson and Johnson
Attys.
N. PETERS, PHOTO-LITHOGRAPHER, WASHINGTON, D C.

2 Sheets—Sheet 2.
C. H. SIKES.
Plant and Vine Culture.
No. 221,620.      Patented Nov. 11, 1879.
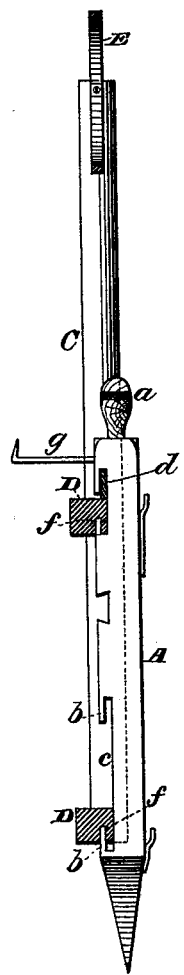
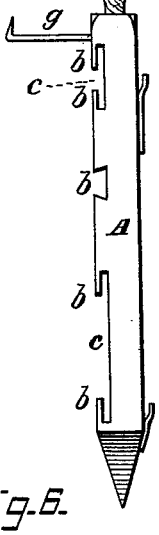
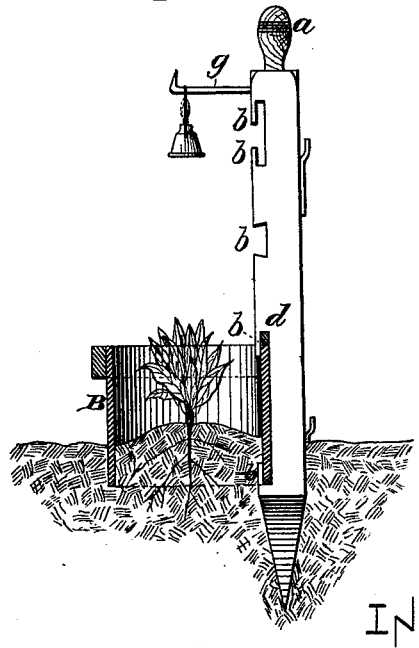
WITNESSES:
Jas. E. Hutchinson.
Floyd Norris.
INVENTOR-
Charles H. Sikes,
by Johnson & Johnson
Attys

UNITED STATES PATENT OFFICE.

CHARLES H. SIKES, OF ELLICOTTSVILLE, NEW YORK.

IMPROVEMENT IN PLANT AND VINE CULTURE.

Specification forming part of Letters Patent No. 221,620, dated November 11, 1879; application filed March 11, 1879.

*To all whom it may concern:*

Be it known that I, CHARLES H. SIKES, of Ellicottsville, in the county of Cattaraugus and State of New York, have invented certain new and useful Improvements in Plant and Vine Culture, of which the following is a specification.

In my improvements in plant and vine culture appliances I use a hill-stake, in connection with a hoop-protector and trellis-hoops, for low-running plants, and an extended trellis for high-training vines and plants which are garnered. The stake is furnished with fastenings for supporting a hoop-protector for the plant against the ravages of poultry, &c., and for supporting one or more trellis-hoops, and these are interchangeable upon the same fastenings with the extended high-training trellis.

A watering-pot for fertilizing is suspended from said stake in proper relation to the plant and its protector, and a torch or open light is used with said stake interchangeably with the fertilizing-vessel for the destruction of the miller at night in cabbage and other vegetable plant culture. By such adaptation of the stake-fastenings it is made a fixture where driven, and is ready to receive and hold the appliances from season to season, according to the plant under culture.

Referring to the drawings, Figure 1 represents the stake with the hoop-protector and fertilizing-vessel; Fig. 2, the stake with the hoop-protector and the trellis-hoops; Fig. 3, the stake with the extended trellis; Fig. 4, a section of the same as secured upon the stake-fastenings; Fig. 5, the stake as adapted for use; and Fig. 6, the stake with the hoop-protector and the torch, (shown as interchangeable with the fertilizing-vessel.)

The stake A is of suitable length, with a handle, $a$, and a pointed end for entering the ground. It is provided with fastening points or hooks $b\ b$ at suitable intervals on its side, between which a space, $c$, is formed, making a sort of a locking dovetail, adapted to receive and lock over the hoops, as in Figs. 1 and 2, or into the cross-rails of the upright trellis, as in Figs. 3 and 4, and allow the hooked or supported parts to be fastened by a wedge, $d$, driven into said space above the hooked part in such a manner as to allow the hoops and the extended trellis to be interchangeably used upon the said stake, and with the same fastenings. For this purpose the fastening-points extend toward each other and are suited to the width of the part to be fastened, as the hoop-protector B, from its depth, requires a greater space between said fastening-points than the trellis-hoops $B'$ $B^2$ do. These latter are for training.

The protector B is seated in the ground and is provided with a removable cover, $c$, Fig. 1, of wire or other suitable open work, for the protection of the plants from insects, &c. I use this hoop-protector B for all plants, whether low or high running; but, as it is removable, I take it away from the stake after high-running plants have obtained a certain growth, and place in its stead the extended trellis.

For strawberries I use a narrow hoop, $B'$, three or four inches above the protector, and for tomatoes I use a second narrow hoop, $B^2$, at or near the top of the stake, and these furnish sufficient trellis for low-running plants with slender stems; but for some plants I use one trellis-hoop only, and move it to the top fastenings as the plant matures.

For hops, beans, grapes, &c., I use the extended trellis C, secured by the cross-bars D, which are provided with slots $f$, adapted to interlock with the fastening-points $b$ of the stake at its top and bottom, and to be secured like the hoops by the wedge $d$, as in Figs. 3 and 4.

Any suitable construction of trellis-frame may be used, and it may have one or more top hoops, E, placed in vertical position between the uprights, which are united by the cross-rails.

For transplanting cabbage-plants I use a water-dipper, F, suspended by a hook, $g$, Fig. 1, from the top of the stake, in position over the plant, so as to drop water thereon and into the protector B for fertilizing and driving away insects. A spigot-plug, $h$, is seated in a hole in the bottom of the pot to form a sort of conductor for the dripping water. At night I use a torch or open light, Fig. 6, upon the hook $g$ in place of the watering-vessel for destroying the miller, the moth of which preys upon and destroys cabbage-plants in their early growth.

My improvements are adapted for use in the garden, farm, nursery, and vineyard for house-plants and flowers, and for the protection of the plants from the weather, frosts, &c.

In using the extended trellis for hop-culture

I cut the vine at the ground and remove the trellis by lifting it from the stake-fastenings, first removing the securing wedge or wedges.

I know that various kinds of plant hoop-protectors and trellises have been used with a stake, but not in connection with a stake with which the protecting and trellis devices are adapted for interchangeable use with the same fastenings, and especially in connection with fertilizing and singeing and heating appliances.

I claim—

1. In plant and vine culture appliances, the combination, with a stake, A, having the locking hook-points $b\ b$, of a wedge, $d$, whereby a plant-protector and vine frame or trellis may be held interchangeably by said stake, substantially as described.

2. A stake provided with locking hook points or fastenings adapted as supports for plant-protectors and trellis, and provided with a torch or open light suspended upon said stake, interchangeable with a watering-pot, and placed in relation to the base hoop-protector as described.

3. A stake for the interchangeable support of a plant protector, B, trellis-hoops B' B², and trellis-frame C D, said stake being provided with the locking hook-points $b\ b$ and the pin or hook $g$, of a length sufficient to suspend a watering-pot in proper relation to the plant and its protector, substantially as and for the purpose herein set forth.

In testimony whereof I have hereunto set my hand in the presence of two witnesses.

CHARLES HENRY SIKES.

Witnesses:
P. R. SHANKLAND,
C. McCOY.